(12) United States Patent
Moalic et al.

(10) Patent No.: US 7,946,529 B2
(45) Date of Patent: May 24, 2011

(54) DETECTION OF EFFORT ON A FLIGHT-CONTROL ACTUATOR

(75) Inventors: Jean-Marc Moalic, Saint Gratien (FR); Pierre Turpin, Maurepas (FR); Philippe Sellier, Etrepagny (FR)

(73) Assignee: Goodrich Actuation Systems SAS, Buc (FR)

( * ) Notice: Subject to any disclaimer, the term of this patent is extended or adjusted under 35 U.S.C. 154(b) by 695 days.

(21) Appl. No.: 12/053,258

(22) Filed: Mar. 21, 2008

(65) Prior Publication Data

US 2008/0315040 A1 Dec. 25, 2008

(30) Foreign Application Priority Data

Mar. 23, 2007 (FR) ...................................... 07 54003

(51) Int. Cl.
*B64C 3/38* (2006.01)
(52) U.S. Cl. ...................... 244/99.4; 244/99.3; 244/99.2
(58) Field of Classification Search ................. 244/99.4, 244/99.3, 99.2
See application file for complete search history.

(56) References Cited

U.S. PATENT DOCUMENTS

| | | | | |
|---|---|---|---|---|
| 2,620,683 A | * | 12/1952 | Geyer | 74/665 Q |
| 3,695,096 A | | 10/1972 | Kutsay | |
| 5,628,477 A | * | 5/1997 | Caferro et al. | 244/214 |
| 6,389,915 B1 | * | 5/2002 | Wngett | 74/89.23 |
| 6,659,399 B1 | * | 12/2003 | Bagnoli et al. | 244/99.4 |
| 6,672,540 B1 | * | 1/2004 | Shaheen et al. | 244/99.3 |
| 6,704,624 B2 | * | 3/2004 | Ortega et al. | 701/3 |
| 6,851,648 B2 | * | 2/2005 | Perni et al. | 244/99.3 |
| 2007/0018040 A1 | * | 1/2007 | Wingett et al. | 244/99.4 |
| 2008/0116317 A1 | * | 5/2008 | Steinberg | 244/99.3 |
| 2010/0001125 A1 | * | 1/2010 | Cavalier et al. | 244/99.3 |

FOREIGN PATENT DOCUMENTS

| EP | 1 557 588 | 7/2005 |
|---|---|---|
| FR | 2 858 035 | 1/2005 |

\* cited by examiner

*Primary Examiner* — Christopher P Ellis
(74) *Attorney, Agent, or Firm* — Pauley Petersen & Erickson

(57) ABSTRACT

The use of at least one attachment screw (12) that includes means (14, 15, 17a, 17b, 20) for detecting the secondary path loading of a flight-control actuator, or associated with a bush that includes such means, for the attachment of the top coupling of the secondary path of a flight-control actuator.

13 Claims, 5 Drawing Sheets

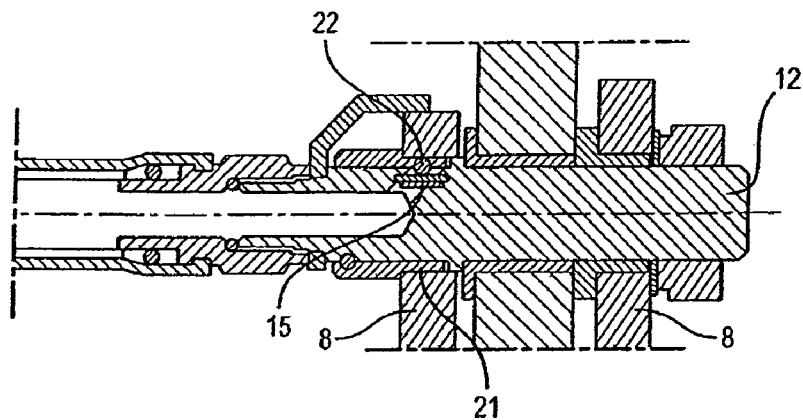
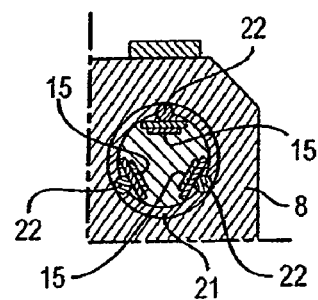
FIG. 4a  FIG. 4b
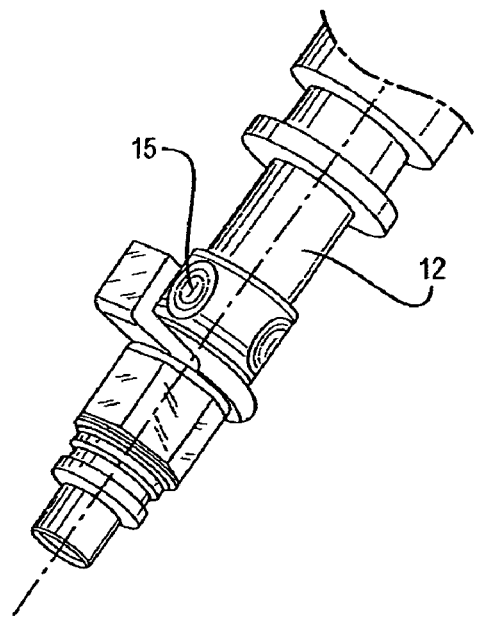
FIG. 5

DETECTION OF EFFORT ON A FLIGHT-CONTROL ACTUATOR

GENERAL TECHNICAL FIELD AND PRIOR ART

This present invention relates to the detection of effort on a flight-control actuator.

In particular, but not limitatively, it relates detection of the take-up of effort by a secondary path of an aircraft flight-control actuator, and in particular advantageously finds its application in the case of an actuator of the "Trimmable Horizontal Stabiliser Actuator" (THSA) type.

It is known that, conventionally, such actuators have two mechanical paths, one being the primary, the other the secondary, the latter being intended to take up the effort once the primary path has failed.

In operation on the primary path, the forces transit via a hollow ball or roller screw. This characteristic is used to include a safety rod (known as a "fail safe" bar), which is grooved at its ends and connected, with a functional gap, to the screw. This structure provides continuity for transmission of the forces and for rotation of the assembly (by avoiding axial separation of the elements of the screw, in the event of rupture of the screw itself). The screw is terminated at one of its ends by a coupling part by which it is connected to the aircraft (primary top coupling). In the event of failure of the latter, the forces are taken up by the fail-safe bar, the end of which is a male shape (a sphere for example) placed in a female shape of a coupling part of the secondary path (secondary top coupling). This secondary coupling is itself connected to the aircraft by means of an aircraft coupling part that is different from that used to support the primary path.

In "normal" operation, when the primary path is carrying the effort, there exists functional gap between the male shape that terminates the fail-safe bar and the female shape of the coupling part of the secondary path, so that the secondary aircraft coupling part supports no effort other than the weight of the female secondary coupling part of the THSA.

When the primary path fails, the male shape that terminates the screw comes into contact with the female shape of the coupling part of the secondary path, which leads to the take-up of effort by the secondary aircraft attachment yoke.

We are already familiar, from FR 2.858.035 or EP 1.557.588 for example, with devices for detecting the take-up of effort by a secondary path.

However, the solutions proposed up to the present are generally based on detection of the movement of, or the distance between, the different parts.

We wish to be able to propose solutions that will still further improve the reliability of secondary path loading detection.

We also wish to be able to propose integration solutions that are less complex than the aforementioned solutions with movement or distance detection sensors.

PRESENTATION OF THE INVENTION

One aim of the invention is therefore to propose a solution for detecting the take-up of effort, especially in order to inform the pilot that the secondary path has taken over from the primary path.

Another aim of the invention is, in particular, to solve this detection problem in a simple and effective manner.

Yet another aim of the invention is to propose a solution that will avoid any accidental detection, even when the actuator must be suitable of being subjected to severe outside environments, in particular of a mechanical, chemical, climatic or electrical nature.

Still another aim of the invention is to propose a solution that is particularly simple in terms of integration.

More particularly, the invention proposes a flight-control actuator that has a primary path, and a secondary path adapted to take up the effort of the primary path in the event of failure of the latter, where the primary path includes a screw, this screw being terminated by a coupling part of the primary path, and where the secondary path includes a fail-safe effort take-up bar traversing the screw, this bar being terminated by a male shape placed with functional gap when the primary path is carrying the effort in a female shape of a coupling part of the secondary path, where the male shape that terminates the bar and the female shape of the coupling part are spherical or of revolution, and with the top coupling of the secondary path being provided by this coupling part, by an attachment yoke of the aircraft, and by means of the attachment nut and bolt type, where the said actuator includes means for detecting the secondary path loading, characterised in that the said detection means of secondary path loading include at least one sensor adapted to detect an effort placed upon at least one of the parts performing the top coupling of the secondary path and adapted to detect the stressing of the latter.

In this way, we detect the stresses on the parts performing the top coupling of the secondary path in order to highlight a take-up of effort by the secondary path.

Such a solution has the advantage of being reliable and not very complicated to implement.

Furthermore, in one embodiment that is not intended to be limiting, a sensor adapted to detect an effort is positioned on at least one attachment screw performing the top coupling of the secondary path and/or on a bush attached to the latter. It will be noted that one important advantage of this solution is that it is easily incorporated into existing equipment, without the need for substantial modifications to the latter (it suffices essentially to change the screw or the screw/bush assembly) and in particular without modification of the attachment yokes of the aircraft and of the actuator.

The sensor adapted to detect an effort can include one or more strain gauges, these gauges being adapted to be deformed under the effect of the stress generated when the secondary path is loaded and takes up the effort.

In particular, provision can be made for at least two or three strain-gauge membranes placed on the external diameter of the screw at 180° or at 120° respectively, opposite to the hole of a yoke of the coupling part in which it is accommodated, where, at the hole of the yoke, the said assembly has a part of the bush type with projecting elements adapted to load one or several membranes, at least in certain loading configurations.

In an alternative, the membranes include a projecting element adapted to be brought into contact by the yoke for one or several membranes at least in some loading configurations.

A device of the spring unit type can be added to the screw so as to render independent the loading of the membranes from the tightening torque effort applied to the screw during the assembly process.

On a set with two equipped screws, it is possible, by means of an electronics unit, to process one or two signals both in a quantitative and relative manner, in order to make reliable the relevance of the measurement.

In another alternative embodiment, provision is made to replace the strain-gauge device by means intended to excite, with vibration, the attachment screw of the top coupling of the secondary path, and/or a bush attached to the latter, as well as means to read off the vibration thus generated, and processing means for detecting a change in the frequency response of the excited parts.

Provision can also be made for a coupling part that includes a deformable bush, attached or not to the axis, and that has at least one pressure sensor to replace the strain-gauge device.

The invention also relates the use of at least one attachment screw that includes means forming a sensor adapted to detect an effort, or of an assembly composed of an attachment screw and a bush that include such means, for the attachment of the top coupling of the secondary path of a flight-control actuator.

PRESENTATION OF THE FIGURES

Other characteristics and advantages of the invention will emerge from the description that follows, which is purely illustrative and non-limiting to, and should be read with reference to the appended drawings, in which:

FIGS. 4a and 4b are schematic representations, in section, illustrating another possible embodiment of the invention;

FIG. 5 is a schematic representation in perspective of the embodiment of FIGS. 4a and 4b;

Figure 8:
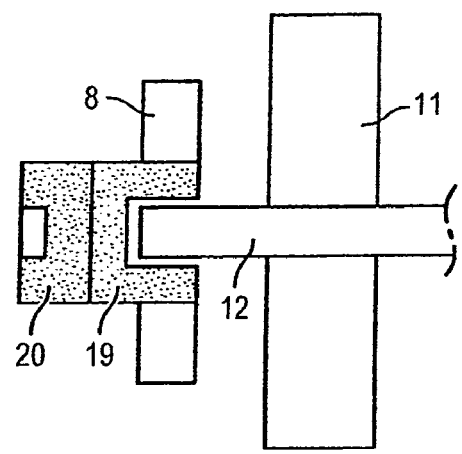
Figure 9:
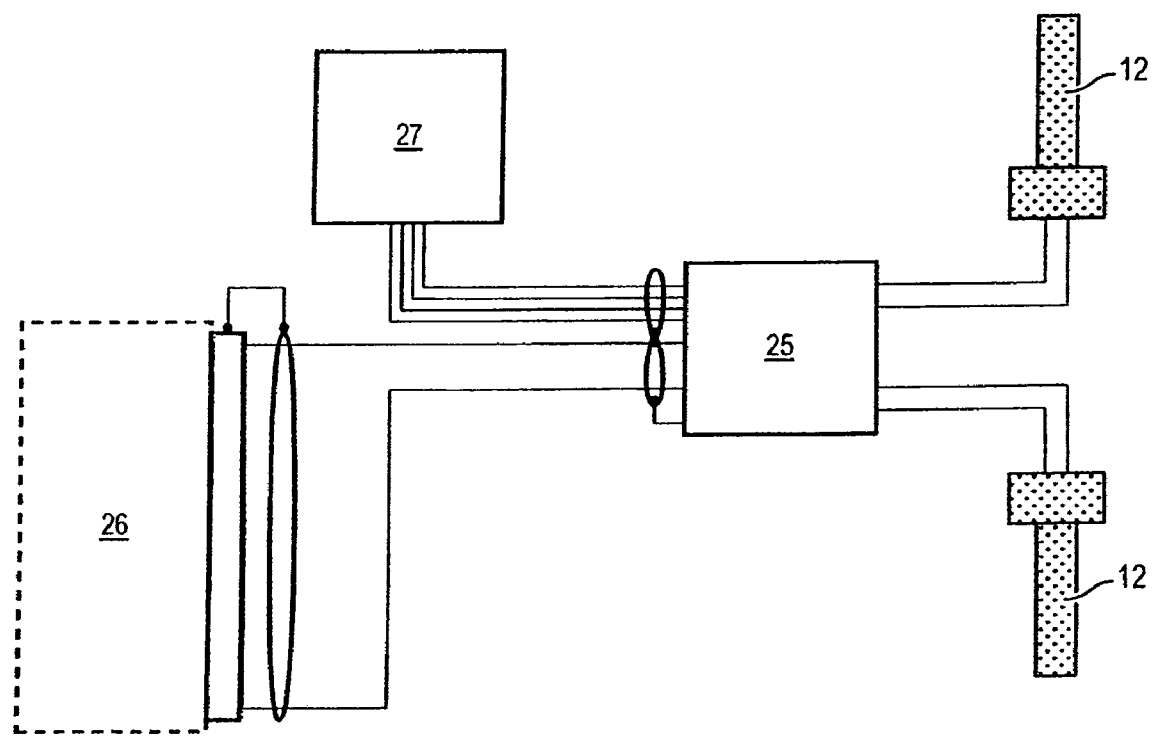

FIG. 8 also illustrates another possible variant;

FIG. 9, finally, schematically represents a configuration of an electric power supply unit and a processing unit, to which are connected the sensors associated with two equipped screws of the type described with reference to the preceding figures.

DESCRIPTION OF ONE OR MORE EXAMPLES OF EMBODIMENTS

General Structure of the Actuator

Figure 1:
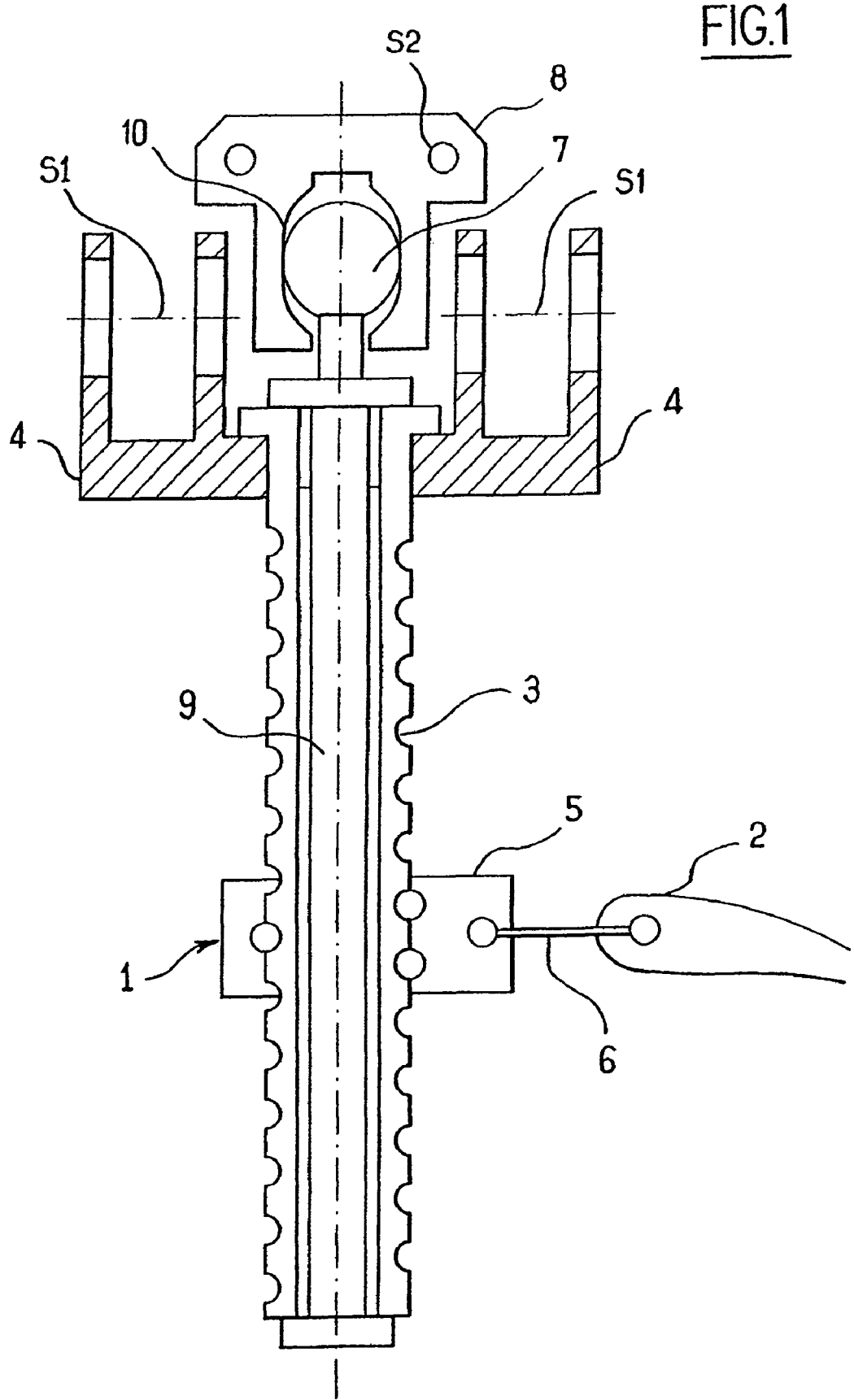
FIG. 1 is a schematic representation illustrating the principle of an actuator.

FIG. 1 schematically represents a flight-control actuator 1 with a primary path and a secondary path.

This actuator 1 can be a jack of the THSA type for example, for the control of a variable horizontal aircraft surface 2.

It includes a primary path with a hollow screw 3 connected at one end, by a universal joint system 4, to the structure S1 of the aircraft. The primary path also includes a nut 5, which fits onto the screw 3, being mounted on the latter, and which is connected to the surface to be controlled 2, by another universal joint system 6 for example.

A fail-safe bar 9 lies on the inside of the hollow screw 3. This bar 9 is terminated by a spherical head 7 located, with functional gap, on the inside of a female spherical shape 10 of a coupling part 8 of the secondary path, this coupling part 8 itself being attached to a structure S2 of the aircraft.

Figure 2A:
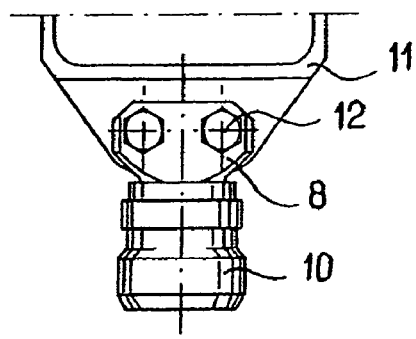
FIGS. 2a to 2c are schematic representations, in a side view and in section, illustrating the attachment of the top coupling of the secondary path.
Figure 2B:
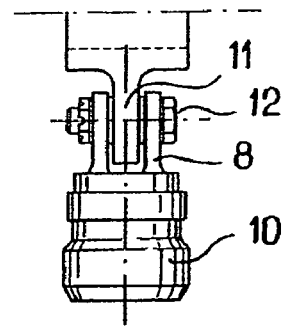
Figure 2C:
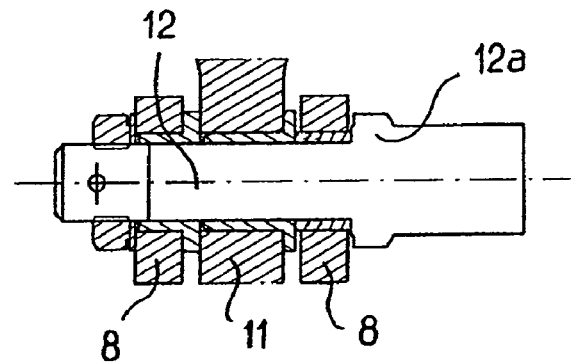

This actuator can be controlled by a hydraulic or electric motor M for example, which drives the screw 3 in rotation and moves the nut 5 in translation, the latter being blocked in rotation for this purpose. The movement in translation of the nut 5 is thus used to control the angling motion that we wish to communicate to the variable horizontal flight surface 2. Attachment of the Secondary Top Coupling FIGS. 2a, 2b and 2c show the attachment of the coupling part 8 of the secondary path to an upper attachment yoke 11 on the structure S2 of the aircraft.

As can be seen in these figures, part 8 is a stirrup that consists of two yokes between which yoke 11 is fitted. Two parallel screws 12 are fitted through the yokes of parts 8 and 11, the assembly being fixed by clamping between heads 12a that terminate the screws 12 at one end and nuts 13 whose thread matches that of the screws 12 at their other end.
Detection of the Loading Detection means adapted to detect an effort are positioned on at least one of the screws 12 or at least one of the two yokes of part 8 to detect the take-up of effort by the secondary path.

Figure 3A:
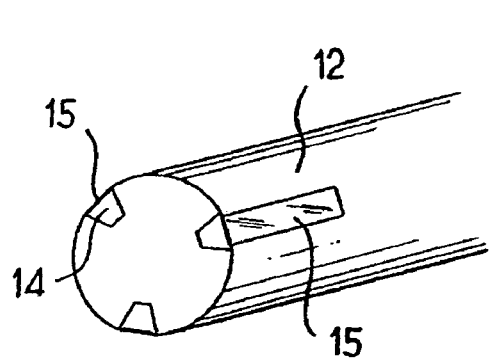
FIGS. 3a and 3b illustrate one possible embodiment of the detection means positioned at the level of the parts participating in the top coupling, as illustrated in FIGS. 2a to 2c.
Figure 3B:
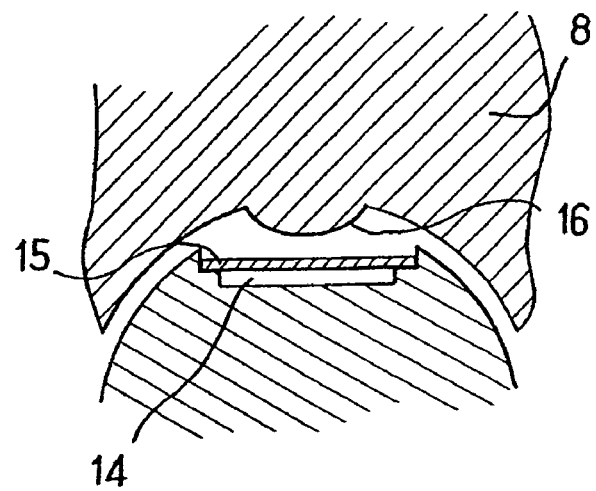

FIGS. 3a and 3b illustrate a solution in which, opposite to one of the yokes of the coupling part 8, one of the screws 12 has several cut-out grooves 14 in which flexible blades 15, bearing strain gauges, are fitted.

For its part, the corresponding yoke of the coupling part 8 includes a certain number of projecting punches 16 which, when the effort is being supported by the secondary path and the coupling part 8 only, yoke 11 and screws 12 are loaded either in compression or in traction, bear against the screw, and deform the strain-gauge blades 15.

The strain-gauge blades can be distributed regularly around the periphery of screw 12 for example. They can be two in number, distributed in a diametrical manner opposite, that it at 180°, to each other on a given periphery of the screw 12. They can also be three in number (distributed at 120° to each other on the screw), or even be higher in number so as to be able to detect forces that may not only be forces in compression or traction, but that may be directed at a certain angle in relation to the main traction/compression direction. It will be noted in particular that a configuration with three or more strain gauges enables one to retrieve a loading signal irrespective of the direction in which this loading occurs.

For their part, the punches 16 have the same distribution as the strain-gauge blades.

The strain-gauge blades can be flexible membranes in the form of a sliver of stainless steel for example, onto which the strain gauges are affixed or embedded.

FIGS. 4a, 4b and 5 illustrate another embodiment, in which three gauges 15 are provided, of the membrane type, distributed at 120° to each other over a periphery of the screw 12. In this embodiment, the yokes of the coupling part 8 do not have a punch, but at the hole of the yoke, between the yoke and the screw, a ring 21 is provided that includes three balls 22 opposite to the membranes that constitute the gauges 15.

Other solutions for the detection of forces at the secondary top coupling can also be envisaged.

In particular, in a variant, the strain-gauge blades can be integrated, not into the screw but, into bushes inserted between the screw and the yokes and/or the nut.

Another alternative is that the membranes include a projecting element adapted to be brought into contact by the yoke, for one or several membranes, at least in certain loading configurations.

Figure 6:
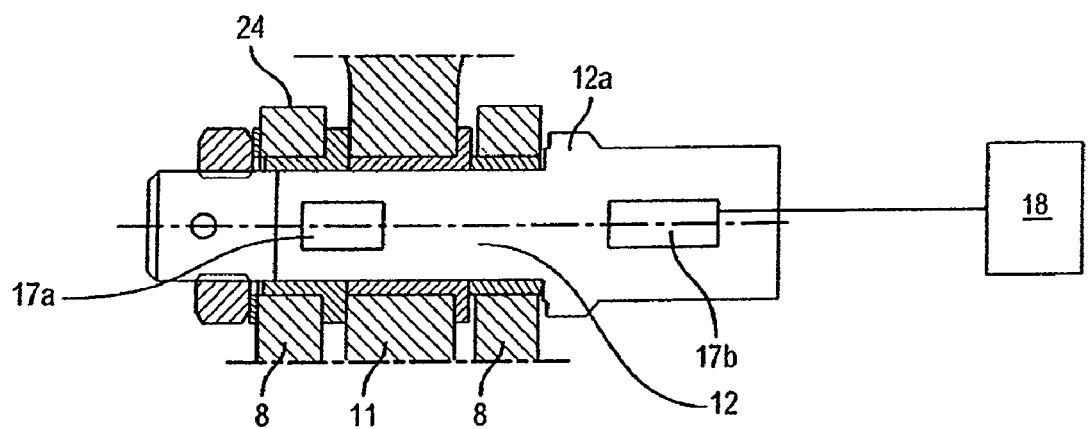
FIG. 6 is a schematic representation in section illustrating yet another possible embodiment.

FIG. 6 illustrates yet another solution for the detection of effort.

In this variant in which two piezoelectric blades 17a, 17b are positioned on one of the screws 12, blade 17a is used to excite screw 12 by making it vibrate around its resonant frequency or frequencies. Blade 17b plays the role of a transducer and reads off the vibration of the screw 12.

It can be seen that, depending on whether the top coupling of the secondary path is loaded or not, the vibration response, and in particular the resonant frequency of the screw 12, changes.

Processing of the frequency response as measured by blade 17b, performing filtering around the resonant frequencies of the screw 12 for example depending on whether it is loaded or not, enables one to detect whether the secondary path has been loaded or not.

This processing can be performed by a computer 18 for example, which can also take account of other external parameters, and temperature in particular, in order to adjust these filtering operations.

This computer 18 itself is connected to an element of the switch type, which it operates in order to open-circuit or earth the circuit for detecting failure of the aircraft flight control.

In a variant, the piezoelectric blades 17a, 17b can be integrated, not into the screw but, into bushes inserted between the screw and the yokes and/or the nut.

They can also be located on other parts participating in the top coupling of the secondary path, such as coupling part 8 or yoke 11 for example.

It will be noted that strain gauge solutions of the type that has just been described have the advantage that they enable one to avoid weakening the attachment assembly of the secondary top coupling, which must be suitable of supporting forces of one to several tens of tonnes, while still allowing the detection of forces of the order of one to several tens of kg.

Figure 7:
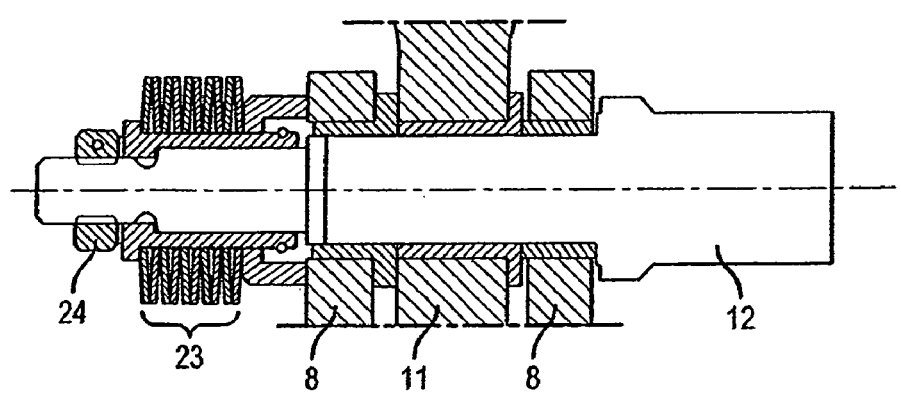
FIG. 7 illustrates still another embodiment.

Furthermore, in addition to the different variants that have just been described, and as illustrated in FIG. 7, it is possible to advantageously insert, between the nut 24 associated with the screw 12 and the yoke of part 8 that it is clamping, a spring assembly or unit 23. This spring unit 23 is used to distribute the clamping forces and to render the loading of the gauges independent of the tightening torque effort applied to the screw during assembly. One thus avoids false detection incidents due to the assembly conditions.

In yet another variant, as illustrated in FIG. 8, it is possible to equip one of the yokes of the coupling part 8 with a bush 19 made up by an envelope filled with silicon, and that includes one or more pressure sensors 20, of the silicon bridge type for example.

During the loading of the secondary path, the screw 12 supporting the effort will load the bush 19. The pressure change will then be detected by the sensor 20 fitted to the ring 19.

It is also possible to envisage equipping either a single screw or both screws 12, or indeed the yoke 11 or the coupling part 8, and more generally greatly increasing the various measurements effected by different detection means, so as to be in possession of a system with a lot of redundancy, and to work differentially where appropriate.

For its part, FIG. 9 illustrates one possible assembly with two attachment screws 12 equipped with sensors of the type proposed in the preceding figures.

In this assembly, the sensors of the screws 12 are connected to an electronics unit 25 (that can include the computer 18 mentioned previously for example with reference to FIG. 6). This electronics unit 25 receives an electrical power feed from a source 26. It performs an initial processing on the measurements from the sensors, and transmits information, in digital form for example, to a computer 27 in the aircraft.

This unit 25 can perform qualitative or quantitative consistency tests for example, on the signals that it receives from the force sensors on the two screws.

As will have been understood from the foregoing, the solutions that have just been described have the advantage of being simple and very reliable.

In addition, detection by means of sensors adapted to detect an effort on the attachment screws or the associated rings has the advantage of being extremely easy to implement.

In particular, it can be installed on existing actuators, without the need for substantial modifications to the latter.

It will be noted finally, since these are solutions in which the gauges are carried by attachment screws, the latter have the great advantage of being easy to install on actuators that are already in service, in particular in the context of a retrofit, since it can be achieved by just replacing the attachment screws of the actuator with screws fitted with gauges.

Finally, the invention has been described here in the case of detection of the take-up of effort by the secondary path of a flight-control actuator, in particular a THSA actuator.

However the use of fitted-out screws of the type just described advantageously find a wider application in the context of the detection of effort on any coupling attachment.

The invention claimed is:

1. A flight-control actuator having a primary path and a secondary path adapted to take up effort of the primary path in the event of failure thereof, the primary path including a screw, the screw terminating in a coupling part of the primary path, the secondary path including a fail-safe effort take-up bar traversing the screw, the bar terminating in a male shape having a functional gap when the primary path is carrying the effort, the male shape placed in a female shape of a coupling part of the secondary path, the male shape terminating the bar and the female shape of the coupling part being spherical or rotational, top coupling of the secondary path being provided by the female shape of the coupling part, an attachment yoke of an aircraft, and a nut and bolt attachment means, the actuator including means for detecting loading of the secondary path, characterised in that said detection means of secondary path loading including at least one sensor adapted to detect an effort (14, 15, 17a, 17b, 20) applied to at least one of the parts (8, 11, 12) performing the top coupling of the secondary path, and adapted to detect stressing of the latter.

2. An actuator according to claim 1, characterised in that the sensor adapted to detect an effort is located on at least one attachment screw (12) performing the top coupling of the secondary path and/or on a bush (19) attached to the latter.

3. An actuator according to claim 1, characterised in that the sensor adapted to detect an effort includes one or more strain gauges (14, 15).

4. An actuator according to claim 2 wherein the sensor adapted to detect an effort includes one or more strain gauges, characterised in that it includes at least one strain-gauge blade (14, 15) located on an indentation presented by an attachment screw opposite to a hole of a yoke of the coupling part (8) of the secondary path in which it is accommodated, the yoke having a projecting element (16) at the hole which is adapted to load the blade at least in certain loading configurations.

5. An actuator according to claim 4, characterised in that it includes at least three strain-gauge blades (14, 15) distributed regularly around a periphery of the screw.

6. An actuator according to claim 1, characterised in that the sensor adapted to detect an effort, includes means (17a) to excite into vibration the attachment screw (12) of the top coupling of the secondary path, and/or a bush attached to the latter, and means (17b) to sense the vibration thus generated on the excited part, and processing means for detecting a change in the frequency response of the excited parts.

7. An actuator according to claim 6, characterised in that the means of excitation (17a) and the means (17b) to sense the vibration are of the piezoelectric type.

8. An actuator according to claim 1, characterised in that at least the yoke of the coupling part (8) of the secondary path includes a deformable bush (19), and has at least one pressure sensor (20).

9. An actuator according to claim 8, characterised in that the deformable bush (19) includes an envelope filled with silicon oil and a silicon bridge pressure sensor (20).

10. An actuator according to claim 1, characterised in that it includes several detection means (17a, 17b) located on one or more of the parts performing the attachment of the top coupling of the secondary path, the several detection means providing a redundancy of measurements or additional measurements.

11. An actuator according to claim 1, characterised in that at least one attachment screw (12) that includes means forming a sensor adapted to detect an effort (14, 15, 17a, 17b, 20) or an assembly that includes an attachment screw and a bush that have such means, is used for actuator coupling attachment.

12. An actuator according to claim 1, characterised in that at least one attachment screw (12) that includes means forming a sensor adapted to detect an effort (14, 15, 17a, 17b, 20), or an assembly that includes an attachment screw and a bush that have such means, is used for the attachment of the top coupling of the secondary path of the actuator.

13. The use of the actuator according to claim 1, in which at least one attachment screw (12) includes means forming a sensor adapted to detect an effort (14, 15, 17a, 17b, 20) is substituted for an attachment screw of an actuator coupling part.

* * * * *